(12) United States Patent
Rune et al.

(10) Patent No.: US 7,746,876 B2
(45) Date of Patent: Jun. 29, 2010

(54) METHOD AND MOBILE ROUTERS IN A COMMUNICATIONS SYSTEM FOR ROUTING A DATA PACKET

(75) Inventors: Johan Rune, Lidingö (SE); Tony Larsson, Stockholm (SE); Mattias Pettersson, Bålsta (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 176 days.

(21) Appl. No.: 11/721,655

(22) PCT Filed: Dec. 22, 2004

(86) PCT No.: PCT/SE2004/001994

§ 371 (c)(1),
(2), (4) Date: Jun. 13, 2007

(87) PCT Pub. No.: WO2006/068557

PCT Pub. Date: Jun. 29, 2006

(65) Prior Publication Data

US 2008/0107123 A1    May 8, 2008

(51) Int. Cl.
*H04L 12/28* (2006.01)
(52) U.S. Cl. .................. 370/401; 455/433; 709/249
(58) Field of Classification Search .......... None
See application file for complete search history.

(56) References Cited

U.S. PATENT DOCUMENTS

| 2004/0029555 A1* | 2/2004 | Tsai et al. ............... 455/403 |
| 2004/0032852 A1* | 2/2004 | Thubert et al. ........... 370/349 |
| 2005/0058100 A1* | 3/2005 | Lee et al. ................ 370/331 |

* cited by examiner

*Primary Examiner*—Chi H Pham
*Assistant Examiner*—Kouroush Mohebbi
(74) *Attorney, Agent, or Firm*—Michael G. Cameron

(57) ABSTRACT

The present invention relates to moving networks in communication systems. An object of the invention is to provide moving network nodes (205, 206) in a moving network (201) with the ability to simultaneously access several external access networks (211, 212, 213) accessible by different mobile routers (204, 207) such that a data packet directed to an address external to the moving network can be sent from a moving network node via any of the mobile routers (204, 207) and via a tunnel setup in any of the simultaneously accessible external accesses to a home agent (216) in a home network (215) of the mobile router. This is achieved by synchronizing between the mobile routers data regarding the external accesses of each mobile router, and, when a data packet is received at a first mobile router (204), the first mobile router selects external access based on the synchronized external access information, information in the data packet and optionally also based on access selection policies. If a selected access belongs to e.g. a second mobile router (207), the packet is forwarded from the first mobile router to the second mobile router before it is sent to the home agent (215) via the tunnel setup through the selected access (211).

32 Claims, 8 Drawing Sheets

METHOD AND MOBILE ROUTERS IN A COMMUNICATIONS SYSTEM FOR ROUTING A DATA PACKET

FIELD OF THE INVENTION

The present invention relates to mobile routers and methods in a communication system for routing a data packet, and more particularly it relates to methods and mobile routers for routing a data packet from a moving network to a home network.

BACKGROUND OF THE INVENTION

In communication systems based on packet data communication, for example based on the Internet Protocol (IP), there is a need for a mobile communication node to be able to communicate with a fixed network infrastructure even when the mobile communication node moves such that it changes its point of attachment to the fixed network infrastructure: The mobile communication node could for example move such that it needs to change from communicating with a first access point belonging to a first Wireless Local Area Network (WLAN) to communicating with a second access point belonging to a second WLAN.

Mobile IPv6 and Mobile IPv4 are prior art protocols enabling such mobility in IPv6 based and IPv4 based networks, respectively. Mobile IPv6 is described e.g. in the document "Mobility Support in IPv6" by D. Johnson et al, RFC3775, published on the Internet by the Network Working Group of the Internet Engineering Task Force in June 2004. FIG. 1 shows a Mobile IPv6 based system and below is explained how mobility is achieved for a mobile communication node in such a Mobile IPv6 based system. The mobile communication node 105, which could be any communication device, for example a laptop or a mobile phone, has a home network 110, which has a Home Agent 111 and a Router 112. The mobile communication node has a stable home address belonging to the address space of the home network. FIG. 1 also shows a first foreign network 120 having at least one Access Point 121 and an access router 122, and a second foreign network 130 comprising an access router 132 and a correspondent node 135 connected to the Access Router 132. All networks are connected via an IP network 140, e.g. the Internet. In a scenario, the mobile communication node 105 is in its home network 110 and has established a connection to the correspondent node 135 connected to the second foreign network 130. The mobile communication node then moves from the home network to the first foreign network 120. The mobile communication node will then, according to Mobile IPv6, send a Binding Update (BU) message (which corresponds to a Registration Request in Mobile IPv4) via the first foreign network to the Home Agent 111 of the home network 110 informing the Home Agent of the mobile node's new address, i.e. it's care-of address in the first foreign network. Thereafter, the Home Agent 111 sends a Binding Acknowledge message (which corresponds to a Registration Reply in Mobile IPv4) to the mobile communication node and a tunnel is established between the mobile communication node and the Home Agent, via the IP network 140. On the mobile communication node endpoint the tunnel has the mobile communication node's care-of address as its outer address and the mobile communication node's home address as its inner address. The following traffic from the mobile communication node to the correspondent node 135 will then transit through the tunnel to the Home network and further to the correspondent node in the foreign network such that the previous connection between the mobile communication node and the correspondent node is preserved. Packets in the other direction, originating from the correspondent node 135, are addressed to the home address of the mobile communication node 105, intercepted by the Home Agent 111 and forwarded through the tunnel to the mobile communication node 105.

In another scenario not just a mobile communication node may be movable in relation to its home network, but a whole network, for example a network within a transport vehicle (e.g. bus, train or airplane). In this case, this so called moving network will have a router through which all communication nodes in the moving network can communicate. In the case of a moving network on e.g. an airplane, the moving network will comprise communication nodes, which may be different users' communication devices, such as laptops, mobile phones, PDAs (Personal Digital Assistants) etc., which communication nodes communicate wireless or wireline with a router within the airplane, such that all communication destined to an external address will pass via the router. A moving network may also be e.g. a Personal Area Network (PAN), wherein a PAN comprises all communication devices belonging to a user and situated within short range radio communication distance form each other, see for example co-pending patent application PCT/SE2004/001027. In this case, the communication devices in the PAN, called PAN devices, will communicate via a PAN device that has external access possibilities, e.g. a mobile phone having access to a GPRS network, such that the PAN device having external access possibilities works like a router for data originating from any PAN device and being directed to an address external of the PAN.

This document deals with mobility for a moving network, which is defined as a network that is mobile in relation to its home network. A moving network can change its point of attachment to a fixed infrastructure or it may have many points of attachment to a fixed infrastructure, but it is still able to communicate with its home network. A moving network is also characterized in that the nodes generating traffic are situated in the network. Such node in a moving network is called a moving network node. In this document, each node in the moving network or connected to the moving network that works like a router for data originating from a moving network node is defined as a mobile router. Examples of such mobile routers are: a PAN device working as a router in a PAN, and a router in a moving network on a vehicle. Note that a node may have both roles, i.e. being both a moving network node and a mobile router, for example a PAN device such as a mobile phone in a PAN.

"The Network Mobility (NEMO) Basic Support Protocol", by Devarapalli et al, published June 2004 as an Internet Draft, which is a working document of the Internet Engineering Task Force, is a protocol that enables a moving network to attach to different points in the Internet. The protocol is an extension of Mobile IPv6 and allows session continuity for every communication node (or communication device) in the moving network as the network moves. It allows a mobile router to maintain a stable network prefix for a moving network, even as the mobile router changes its, and thus the moving network's, point of attachment to a fixed network infrastructure. This prefix stability is achieved through a solution similar to the mobile IPv6 solution, i.e. by making a home agent (HA) in the home network of the mobile router a fixed point of attachment for the Mobile Router (MR) and maintaining connectivity between the HA and the MR through a tunnel. The prefix is allocated from the address range of the home network, and can thus remain the same even as the MR and its network move. When the MR attaches to a network in a new location, it acquires a new care-of address, but its home address and prefix are unchanged. However, just like in Mobile IPv6 the MR has to register its new care-of address in the HA in order to maintain the tunnel between the Mobile Router and the Home Agent.

If, in the current NEMO solution, a bad tunnel is experienced, it will be replaced by a new tunnel by performing a new registration with the HA, this time with a different care-of address, unless the tunnel is re-established through the same interface and point of attachment, and possibly configured on a different interface, depending on the nature of the tunnel problems. If a communication node could get Internet access through multiple access media simultaneously, i.e. could have multiple tunnels established simultaneously, a data flow could be moved from a bad tunnel to a good tunnel much quicker than if only one tunnel at a time can be established. Also, for matters of cost, bandwidth, delay etc. it could be useful for a communication node to get Internet access through multiple simultaneous tunnels. However, the NEMO basic support protocol does not allow this because it allows only a single care-of address to be registered in the Home Agent (HA) for a certain Mobile Router (MR) at any one time. Multiple simultaneous care-of addresses are not allowed and thus multiple simultaneous accesses and MR-HA tunnels are not possible for a MR.

In the co-pending patent application PCT/SE2004/001578 by the same applicant, a procedure is suggested for managing different external access resources simultaneously accessible by a mobile router in a moving network, such that a network according to FIG. 2 based on a mobile IP-like solution can be established. In FIG. 2, which shows a moving network 201 situated e.g. on a train 200, a mobile router 204 of the moving network 201 has a home agent 216 in his home network 215 and a home address and one or more prefixes out of the address range of the home network 215. Moving network nodes 205, 206 attach to the moving network via access points 202, 203 such that they can communicate with the rest of the nodes in the moving network. When the moving network moves, the mobile router 204 may attach to a foreign network. In this case, a tunnel will be set up between the mobile router over the foreign network to the Home Agent 216 in the home network. In this way, according to mobile IP, the mobile router will get a care-of-address to its new location such that it can be reached by a correspondent node via its original address in the home network. In the network shown in FIG. 2, three tunnels are established simultaneously over three foreign networks and an IP network 214 between the Home Agent and the mobile router such that the mobile router has ability to access three different foreign networks 211, 212, 213. To the moving network this ability to access three different foreign networks can be seen as an ability to use three different external access resources: a WCDMA network 213, a satellite access network 212 and a GPRS network 211. To be able to fully make use of the three different external access resources, this procedure suggests that the mobile router controls the use of the different external access resources both for data packets sent in the direction to the home agent and for data packets sent from the home agent to the mobile router. To achieve this, the mobile router 204 classifies a data packet received from a moving network node 205, 206 based on information in the packet and selects an access resource for sending the packet based on the classification. The mobile router also sends implicit or explicit information to the home agent regarding routing of data packets from the home agent to the mobile router, such that the home agent classifies these data packets and selects access resource for sending the data packets based on the information received from the mobile router. With this procedure, a moving network node has the ability to use any of the external accesses of the mobile router simultaneously, such that it can quickly change access e.g. if one external access goes down. Since all decisions regarding which external access to use lies with the mobile router, the moving network nodes do not have to bother about the selection process and, consequently, do not have to have any extra functionality for selecting access.

The procedure described above only discusses a moving network having one mobile router with a plurality of external access possibilities. Although, it may happen that all external accesses present in an area are not handled by one and the same mobile router. For example, on a train there may be a fixed mobile router mounted in each railway-carriage. Also, for technical reasons, different external accesses may not be handled by the same mobile router. Therefore, to be able to give the moving network nodes in a moving network the ability to use all external accesses that are present in an area, there is a need for a function that can provide a moving network node with the ability to access external accesses provided by different mobile routers in a moving network such that a data packet can be sent from a moving network node and directed to an address external to the moving network via any of a number of external accesses provided by the different mobile routers. Also, there is a need to control the use of the different external accesses provided by the different mobile routers such that the external accesses are used in an efficient way.

The term flow or data flow used in the application is a loose term for a connection between two end nodes. A flow between a first and a second end node may have two directions: from the first node to the second node and vice versa. Thus, in the application, a data flow comprises an uplink part and a downlink part, wherein the uplink part is in the direction from the moving network node to the home agent (and further to the correspondent node), and the downlink part is in the direction from the home agent to the moving network node. A TCP (Transmission Control Protocol) connection is typically seen as a flow. A node can have multiple flows towards different correspondent nodes and also multiple flows towards the same correspondent node. Each flow comprises data packets. A flow is typically defined by the source and destination IP addresses and port numbers, plus the transport protocol in use, such as TCP or UDP (User Datagram Protocol). It is also possible to instead define a flow by its flow label (in IPv6) or its SPI (Security Parameter Index) together with the source and destination IP addresses, and the protocol in case of the SPI. The flow label is more specific than the port numbers and should have precedence over them. The SPI is used in IPsec (IP security as defined in RFC 2401 "Security Architecture for the Internet Protocol"), together with the destination IP address and the protocol to identify the security association, and the SPI-destination address-protocol triplet is typically used as a (unidirectional) flow identifier when the packet is encrypted and the port numbers are visible only to the receiving end-node. The terms link, access and external access used in the application are synonymous. One external access or link defines one possible way of getting external access from the moving network. There is one tunnel established between a Mobile Router and a Home Agent per external access.

The term Home Agent used in the application should be interpreted as any node in a home network working like a mobile anchor point to the moving network, i.e. facilitating communication from the moving network over an external network and the home network, such that the present invention can be used.

SUMMARY OF THE INVENTION

An object of the present invention is to provide a moving network with the ability to simultaneously access external accesses provided by different mobile routers of the moving network.

The above object is achieved by a method, a mobile router and a computer program product set forth in the characterizing part of the independent claims.

This is provided by each mobile router having information about the external accesses in the moving network, and by, when a first mobile router receives a data packet from a moving network node, the first mobile router selecting over which of all external accesses in the moving network to route the data packet based on information in the data packet and on the external access information. Thereafter, the packet is routed over the selected external access.

According to a first aspect of the invention, a method is provided in a communication system for routing a data packet originating from a moving network node in a moving network via a first mobile router of the moving network to a home agent in a home network of the moving network. The first mobile router has ability to access at least one first external access through which at least one first external access one tunnel each is set up to a first home agent of the first mobile router. The moving network also has at least one second mobile router which has ability to access at least one second external access, through which at least one second external access one tunnel each is set up to a second home agent of the at least one second mobile router. Each mobile router in the moving network has information regarding the at least one first and the at least one second external accesses in the moving network. The method comprises the steps of:

receiving, at the first mobile router, a data packet from a moving network node;

selecting, in the first mobile router, one of the at least one first or second external accesses for routing the data packet to the first or second home agent based on information in the data packet and on the information regarding the at least one first and the at least one second external accesses;

routing the data packet from the first mobile router to the first or second home agent via the tunnel set up through the selected external access.

According to a second aspect of the invention, a mobile router of a moving network is provided in a communication system, which mobile router is arranged for routing a data packet originating from a moving network node in the moving network to a home agent in a home network of the moving network. The mobile router has ability to access at least one first external access, through which at least one first external access one tunnel each is set up to a first home agent of the mobile router. The mobile router comprising:

means for storing information regarding the at least one first external access and regarding at least one second external access, which at least one second mobile router has the ability to access, and through which at least one second external access one tunnel each is set up to a second home agent of the at least one second mobile router;

means for receiving a data packet from a moving network node;

means for selecting one of the at least one first or second external accesses for routing the data packet to the first or second home agent, wherein the selection that the means for selecting is arranged to accomplish is based on information in the data packet and on the information regarding the at least one first external access and the at least one second external access; and means for routing the data packet to the first or second home agent via the tunnel set up through the selected external access.

According to a first embodiment of the invention, the selection over which external access to route the data packet is also based on external access policies residing in the mobile routers.

According to a second embodiment of the invention, the external access information and the external access policies are synchronized between the mobile routers in the moving network when required, such that the mobile routers will make the same routing decision for a data packet.

An advantage with the present invention is that the invention makes it possible for a moving network node to get access to external accesses available from different mobile routers in the moving network.

A further advantage of the present invention is that the routing decisions made in the mobile routers are transparent to the moving network nodes, meaning that the moving network nodes do not have to be upgraded in any way to be able to access external accesses provided by different mobile routers.

A still further advantage is that the external accesses of the different mobile routers are simultaneously accessible from the moving network, such that e.g. more bandwidth can be available to the moving network nodes.

Another advantage is that if a mobile router for some reason loses contact with the rest of the moving network, e.g. goes down, the moving network can still get external access via the other mobile routers in the moving network. Also, since the external accesses are simultaneously accessible, an ongoing session (data flow transmission) can be transferred to another access if an access or a mobile router goes down, such that the ongoing session is not lost.

Yet another advantage of the invention is that it can handle the case when there are many different mobile routers at hand in an area simultaneously without having to upgrade the moving network nodes.

BRIEF DESCRIPTION OF THE DRAWINGS

The invention will in the following be described in more detail with reference to enclosed drawings, wherein.

DETAILED DESCRIPTION

Figure 1:
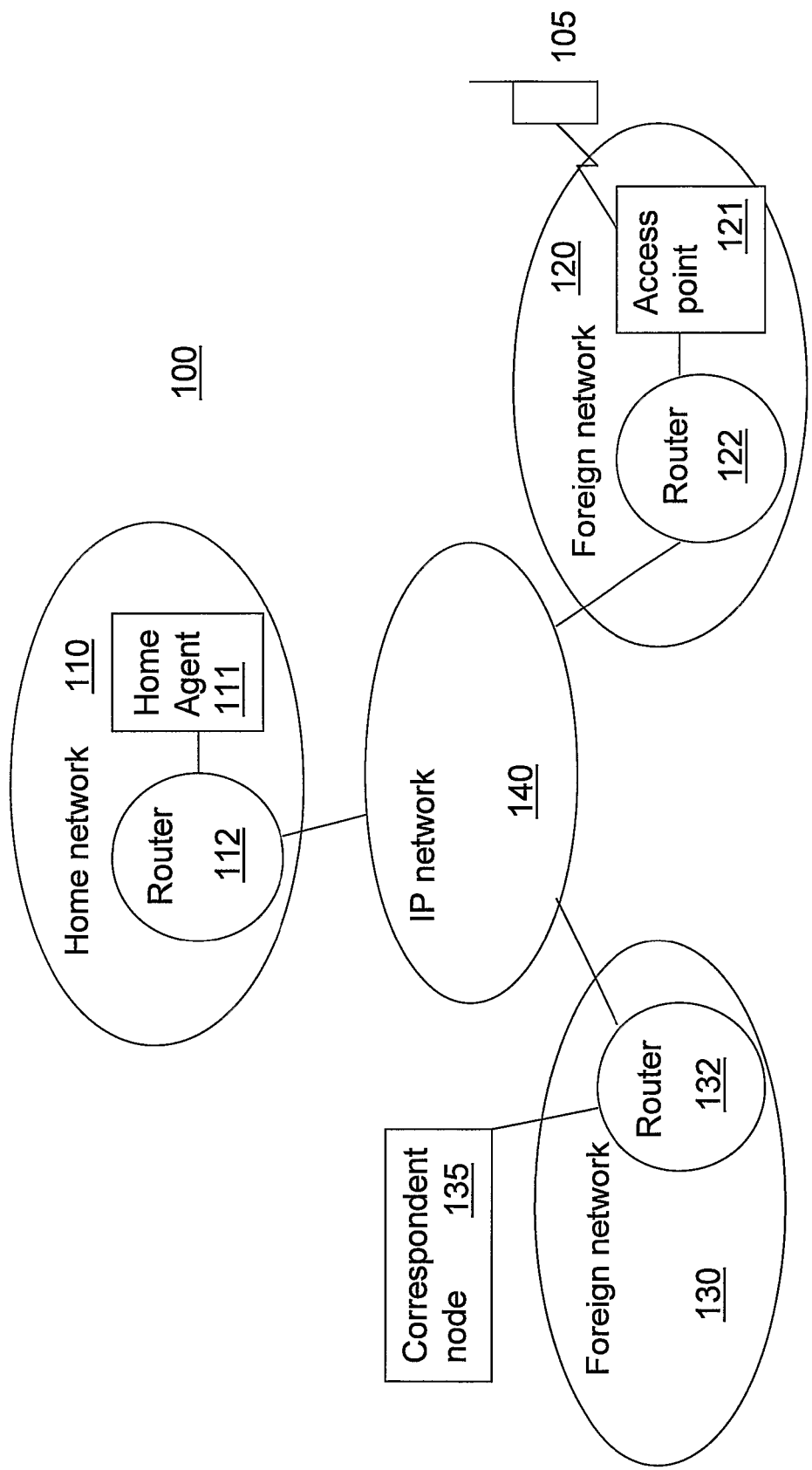
FIG. 1 shows a schematic block diagram of a communication system according to prior art.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 2:
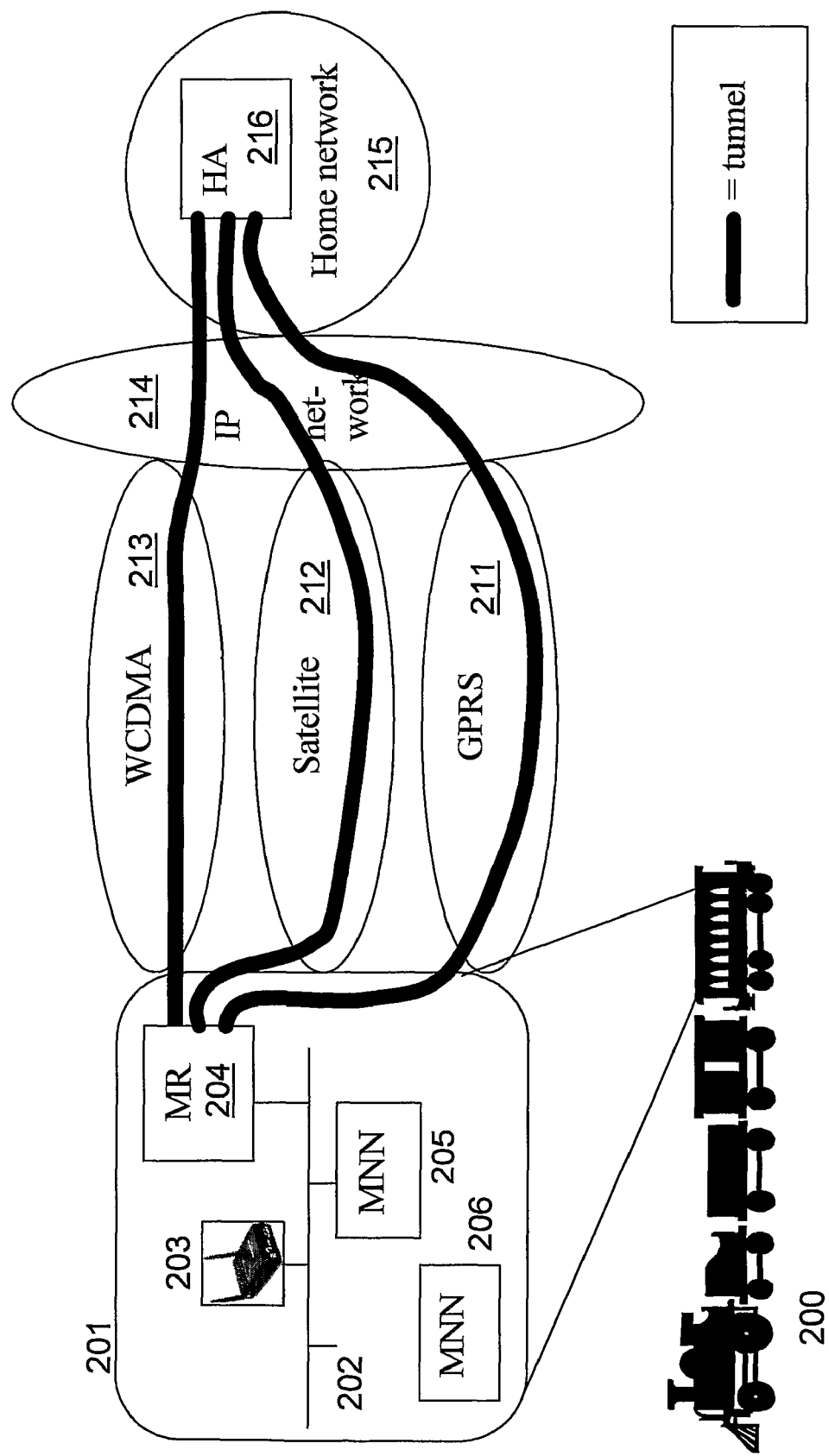
FIG. 2 shows a schematic block diagram of another communication system according to prior art.
Figure 3:
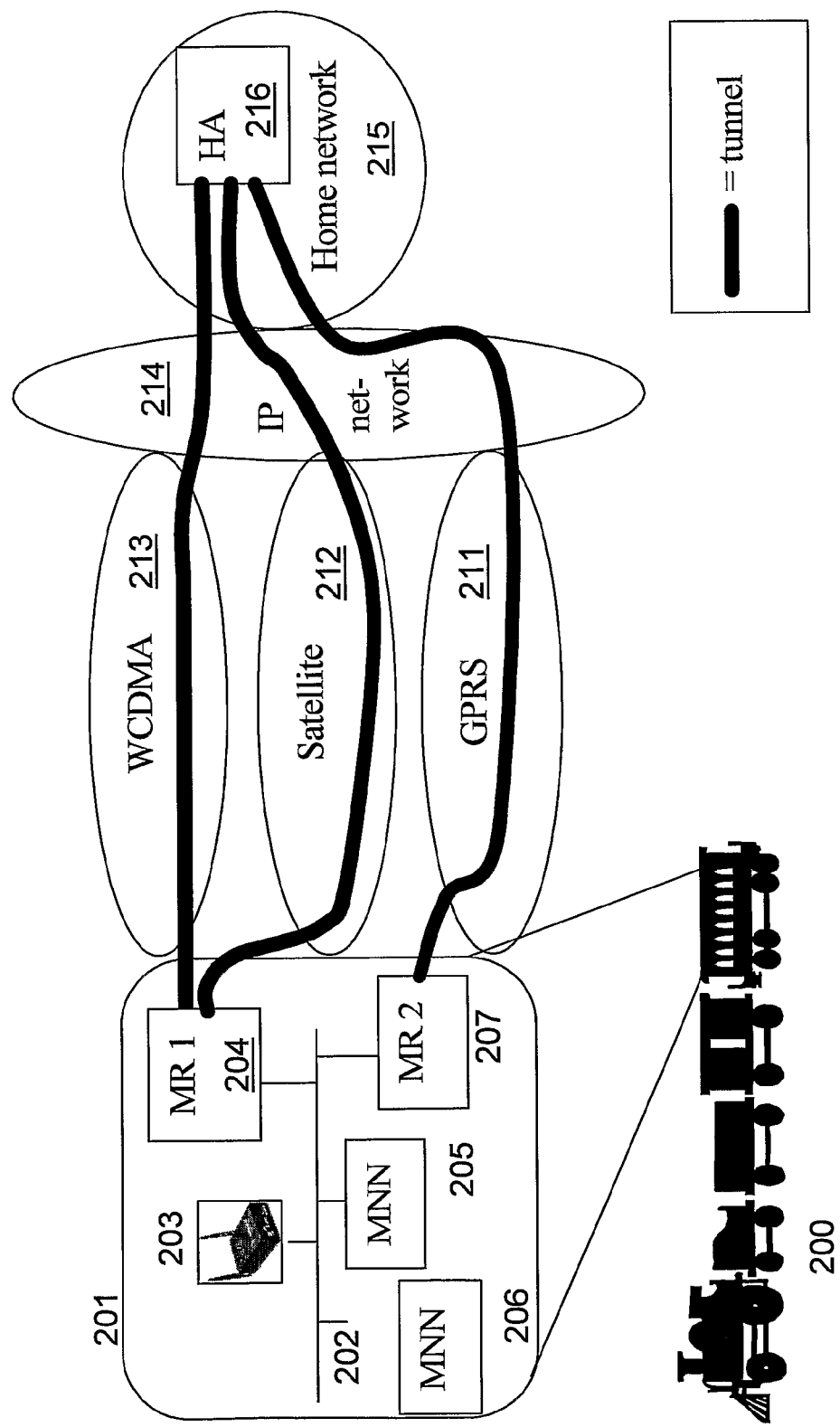
FIG. 3 illustrates a schematic block diagram of a communication system wherein the present invention can be used.

FIG. 3 shows a schematic block diagram of an exemplary communication system wherein the present invention can be used. The system is similar to the prior art FIG. 2, with the difference that the system of FIG. 3 has two different mobile routers, a first mobile router 204 and a second mobile router 207, compared to a single MR in the system of FIG. 2. The system has a Vehicle Area Network (VAN) 201 which is an example of a moving network for which the present invention can be used. The VAN 201 is in this case situated on a train 200, which may be moving. The VAN may be some sort of switched Ethernet that may have either Ethernet ports 202 or WLAN access points 203 or a combination of Ethernet ports and WLAN access points (as shown in the figure). Moving network nodes (MNNs) 205, 206 may connect to an Ethernet port or to a WLAN access point. The moving network nodes may be any communication node such as laptops or mobile phones belonging to persons travelling on the train. As mentioned above, the exemplary VAN also has a first and a second Mobile Router (MR) 204, 207 which act as default gateways for the MNNs inside the vehicle, such that a data packet sent from a moving network and directed to an external network address can be sent via any of the mobile routers. The mobile routers 204, 207 are responsible for mobility management for the entire VAN 201, i.e. mobility management is totally transparent to the MNNs 205, 206 entering the vehicle. This means that no new requirements are put on the MNNs when joining the VAN. The first and the second mobile router have the same home agent 215 in the same home network and the same address prefix from the address range of the home network. This facilitates their shared responsibility for the mobility management of the moving network according to the invention. Although, it may be possible that the first and the second mobile routers have different home agents that can reside in the same home network or in different home networks. Of course, it is also possible to have more than two mobile routers offering external access. For the purpose of routing packets destined to an external network address, the first and the second mobile router 204, 207 have external accesses for the VAN comprising one or several different access networks. In FIG. 3 the first mobile router 204 has two external accesses, a first external access via a Wideband Code Division Multiple Access (WCDMA) network 213 and a second external access via a satellite radio communication network 212. The second mobile router 207 has one external access via a General Packet Radio Service (GPRS) network 211. Each of these access networks is available via geographically distributed access points belonging to each access network, as is well known in the art. One or several of these access networks can be available at the same time depending on for instance coverage and operator policies. FIG. 3 also shows a Home Agent (HA) 216 in a home network 215, which in the example is the home network for both the first mobile router 204 and the second mobile router 207. Data packets from any of the MNNs and destined for e.g. a correspondent node in a foreign network is routed via any of the access networks, an IP network 214 and via the home agent 216 in the home network 215. For this purpose, a first tunnel is set up from the first mobile router 204 over the WCDMA network 213 and the IP network to the home agent 216 in the home network 215, a second tunnel is set up from the first mobile router 204 over the satellite communication network 212 and the IP network to the home agent 216 and a third tunnel is set up from the second mobile router 207 over the GPRS network 211 and the IP network to the home agent. It is also possible that two mobile routers have the same type of access, e.g. that both MRs have WCDMA access. According to the invention, the different external accesses offered by the networks 211, 212, 213 can be used simultaneously by the moving network, as will be described later.

There are several reasons motivating why support for simultaneous usage of several accesses would be beneficial in the scenario of FIG. 3:

It would be possible to handle the dynamic nature of the external accesses, i.e. the fact that accesses will go up and down depending on access technology and coverage. By having multiple simultaneous accesses, the MRs will be able to quickly move traffic between the different accesses when for instance one access goes down. According to the invention, moving traffic can take place both between two accesses of a single MR or between two accesses of two different MRs.

Simultaneous use of multiple external accesses means more bandwidth to the users of the moving network nodes in the moving network, which would improve the communication possibilities for the moving network nodes.

Also, to do load-sharing between the different external accesses, using different load-sharing algorithms, would improve the performance of the system and the users' system experience.

The solution according to the invention will make it possible for a mobile node, e.g. the moving network node 205 in FIG. 3, in the moving network to use any of the available external accesses, even an access provided by the second mobile router, despite the fact that the mobile node has the first mobile router as its default router, i.e. that the mobile node sends its packets to the first mobile router. Since the routing decisions are made in the mobile routers, the moving network nodes do not have to be upgraded to be able to access external accesses provided by different mobile routers.

Also, a mobile node may choose MR arbitrarily. This means that data packets belonging to the same flow may end up in different mobile routers. Still, the packets should be sent over the same external access. Therefore, the choice of access is made consistently across all MRs in the moving network. For this case, the MRs according to the solution are synchronized such that conditions for choosing external access are the same for all mobile routers such that e.g. packets belonging to the same flow are sent over the same access.

Figure 4:
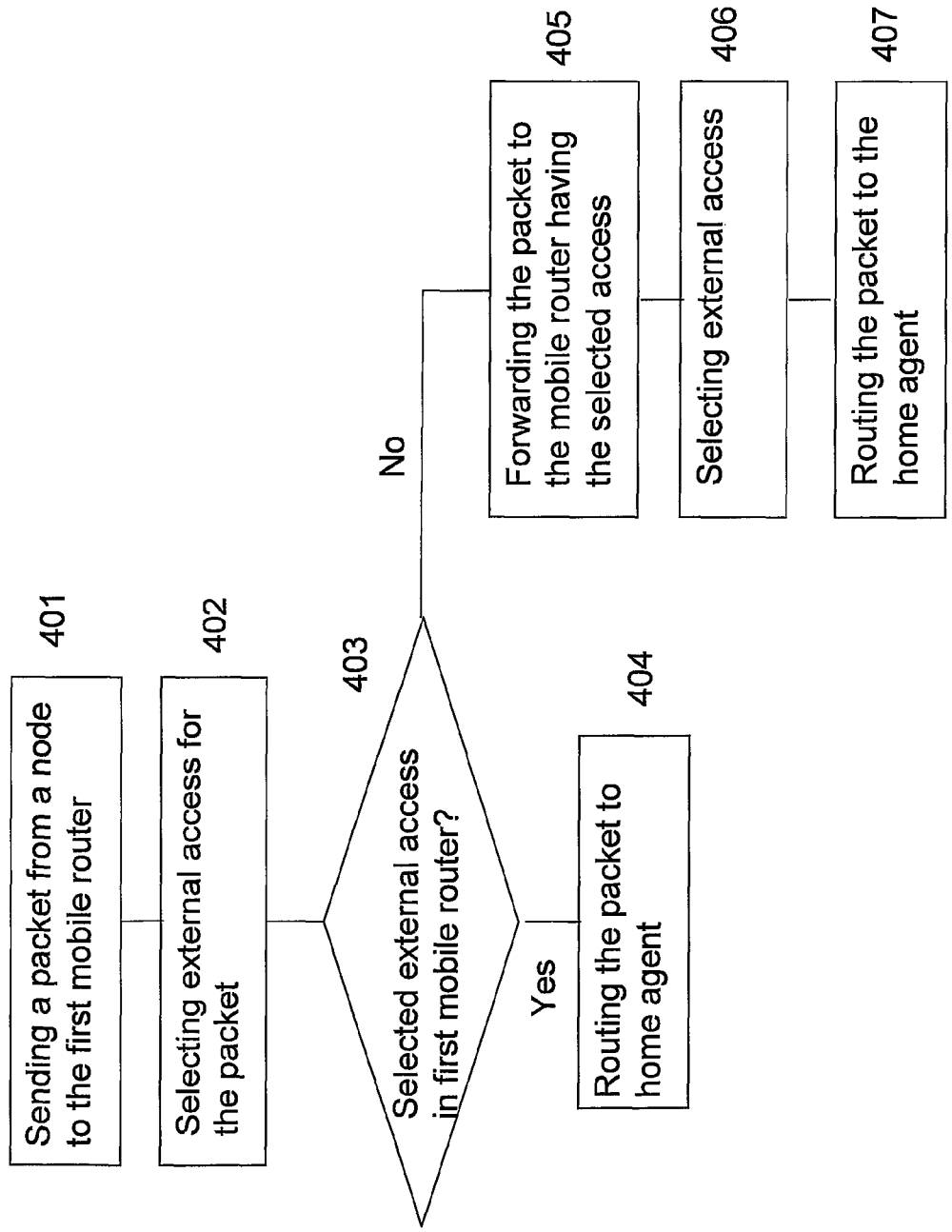
FIG. 4 is a flow chart of a method according to an embodiment of the invention.

In the system described above in relation to FIG. 3, the solution of the invention achieves that a moving network node can use any of the different external access resources of a moving network even if they are provided by different MRs. It also achieves that the different external access resources can be used in an efficient way for the moving network. In FIG. 4 an embodiment of a method according to the invention is shown in relation to the system of FIG. 3.

Supposing that the moving network node 205 is about to send a packet to an external node (not shown in FIG. 3). The packet will then be sent via any of the mobile routers 204, 207, and via a tunnel over any of the access networks 211, 212, 213 and over the IP network 214 to the home agent 216 of the home network 215 of the mobile routers 204, 207, which home agent routes the packet further to the external node. The tunnels have been established by each MR creating a Care of Address (CoA) on each external access interface such that each CoA has been registered with the Home Agent. In an embodiment of the invention it is assumed that all MRs of the moving network register with the same HA and that the MRs all use the same Mobile Network Prefix (MNP). The MNP is the address space an MR has been delegated (e.g. from the HA) and that it allows MNNs to form addresses from. However, it is also possible within the scope of the invention that different MRs use different MNP, and that different MRs register with different HAs.

When a packet is sent from a moving network node to any of the MRs, the MRs, e.g. the first and the second mobile router 204, 207 of FIG. 3, have information about each other's external accesses, information regarding e.g. which external accesses the other mobile routers in the moving network have, which capacity the external accesses have, the momentary status of the external accesses etc. This information has been transmitted from and received by all MRs of a moving network. When required, for example when a type of information has changed, this information is exchanged between all the MRs such that all MRs have the same information regarding the external accesses in the moving network, i.e. the information regarding the external accesses in the moving network is synchronized among the mobile routers in the moving network. A synchronization may also take place on a periodical basis.

According to a preferred embodiment of the method of the invention shown in FIG. 4 and used for the exemplary system according to FIG. 3, when a data packet has been sent 401 from the moving network node 205 to one of the mobile routers 204, 207, e.g. the first mobile router 204, the first mobile router selects 402 one of the different external accesses provided by the first mobile router or the second mobile router for routing the data packet to the home agent via one of the tunnels set up over each of the external access networks 211, 212, 213. The selection is based on information in the data packet and on the information about the external accesses. When required the selection is also based on configuration and access selection policies in the MRs. Information in the data packet used for the selection may for example be a flow identification such as source and destination IP address plus one of:
  source and destination port number plus protocol number, flow label, or
  Security Parameter Index (SPI) and protocol number, which in this case will indicate a security protocol such as Encapsulating Security Payload (ESP) or Authentication Header (AH).

Thereafter, if the selected external access is in the first mobile router 403, e.g. is at the WCDMA network 213, the packet is routed 404 via the tunnel over the WCDMA network and the IP network to the home agent 216 and further to the external address. If the selected external access is in the second mobile router 403, e.g. if it is at the GPRS network 211, the data packet is forwarded or tunneled 405 to the second mobile router 207. In the second mobile router, external access is selected 406 according to the same data as for the selection done in the first mobile router, such that the same external access is selected, i.e. the GPRS network access 211. Then the packet is routed 407 to the home agent via the tunnel over the GPRS network and the IP network.

The step of selecting external access also comprises reading the information in the data packet to detect whether the data packet belongs to an already recorded flow. This detection takes place by e.g. comparing the flow ID of the data packet to flow IDs stored in a database in the mobile router. If the data packet belongs to an already recorded flow, the selection will be done according to a routing decision made for a previous packet of the already recorded flow. For this reason, the access selection for the previous packet was recorded and stored in the mobile router as a flow state comprising flow identification and routing decision.

If the packet belongs to a previously unidentified flow the MR will in addition to using external access information, select access based on access selection policies configured in the MRs. Such policies may, for example, have been preconfigured by the MR operator or the MNN user, such as subscription profiles, access classifications and selection principles, Other policies will change dynamically, such as load-sharing algorithms etc. An access selection policy may also be of the type:
  To aggregate the throughput of the different accesses to improve the access throughput experienced by the MNNs.
  To apply load-sharing policies to make the most efficient use of the available access resources (e.g. to maximize the end-user experience).
  To differentiate MNNs e.g. based on subscription profiles.
  To differentiate flows e.g. based on application.
  To provide redundancy, e.g. using one of the available accesses as a backup that is activated only when the other access/accesses is/are broken.

For all MRs to make the same decision given the same input, the access selection policies are also synchronized between the MRs, when required, for example when a policy has changed.

As mentioned above, for a packet belonging to a previously unidentified flow, the MR will create and store a state for the flow, which state comprises the routing decision and a flow identification. According to an alternative embodiment of the invention, the flow state can also be transmitted to other mobile routers such that the flow state is synchronized between the MRs. Thereby, it will be assured that the MRs will make the same routing decision even if packets are received at different MRs.

An access selection policy may either be statically configured by e.g. the operator, regarding for example how and if load sharing is to be used and which access selection principles that shall be used, or the policy may be dynamically configured, regarding for example the load sharing and access selection principles that are going to be used for the moment. Any user preferences may also be used in a policy. The policies may also include data of more dynamic nature, such as subscription profiles. An example of a selection principle could e.g. be that a certain application, indicated by a certain port number, should be sent over the available access link that has the highest bandwidth. Another example is that a certain real-time application, indicated by a certain port number, should be sent over the available access link that has the lowest latency. An example of an access classification could be that a satellite access is classified as a high latency access. Another example could be that an IEEE 802.11a access (W-LAN) is classified as a high bandwidth access. An example of a simple load sharing algorithm is to allocate flows to different accesses according to round robin principles. However, once an access has been selected for a certain flow, the same access should preferably be kept for the entire lifetime of the session/flow. Another example of a load sharing algorithm is to strive to maintain an equivalent relative saturation of the available bandwidth of the respective available accesses. An example of information that could be included in a subscription profile could be that a concerned subscriber is allowed to use only low and medium bandwidth access like e.g. GPRS and WCDMA, whereas higher bandwidth access like IEEE 802.11a may be used for the concerned subscriber only if no accesses with lower bandwidth are available.

Figure 5:
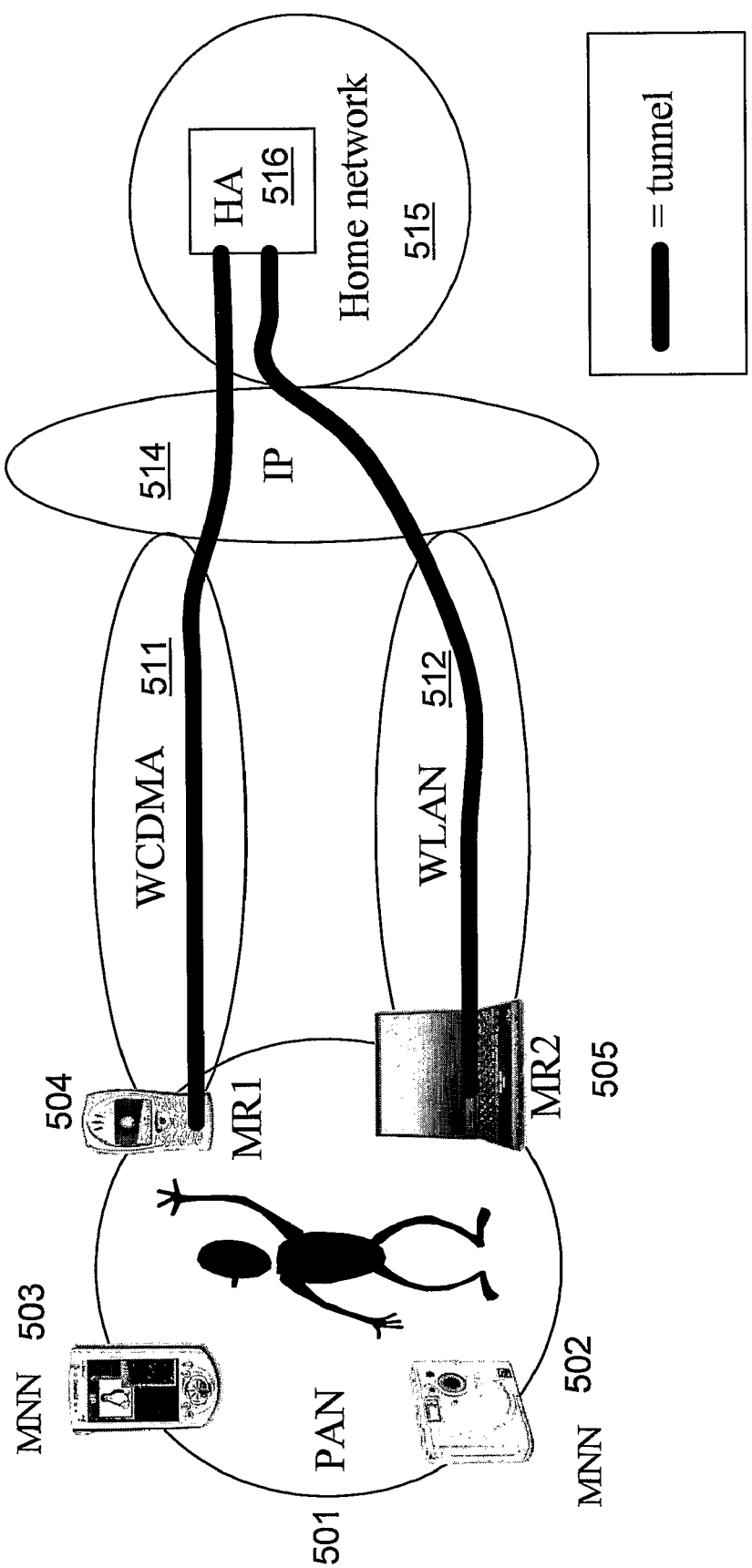
FIG. 5 illustrates a schematic block diagram of another communication system wherein the present invention can be used.

FIG. 5 shows another exemplary communication system wherein the present invention can be used. In this example, the moving network is a Personal Area Network (PAN). A PAN is a network that wirelessly connects communication devices being in the vicinity of a user into a short-range communication network. The PAN is then constituted by the communication devices that are within short-range communication distance of each other. The PAN can for instance comprise the communication devices that the user is carrying with him/her or the network within the user's personal car. The PAN consists of a switched Ethernet network based on for instance Bluetooth running the PAN profile. Some of the PAN devices have external access facilities. As described in co-pending patent application PCT/SE2004/001027 by the same applicant, the external access facilities of these PAN devices can be used by all devices in the PAN to get external access. Thereby, the PAN devices having external access facilities function as mobile routers for the PAN.

The PAN 501 according to FIG. 5 comprises PAN devices 502-505, from which the two PAN devices 504, 505 have external access possibilities and, consequently, act as mobile routers (MRs) for external network access. The MRs 504, 505 are also responsible for mobility management of the moving network, i.e. the PAN. The external accesses provided by the MRs can for instance be a cellular phone 504 providing WCDMA access 511 and a PDA 505 providing WLAN access 512. These accesses can according to the invention be available at the same time and the solutions/mechanisms described in this application look into the cases where the PAN has several MRs providing one or several external access each. As in the VAN with multiple MRs shown in FIG. 3, in this example, the MRs in the PAN share the same Home Agent 516 and the same prefix from the address range of their home network 515. The MRs are communicating with the Home Agent (HA) deployed in the home network via tunnels setup to the home agent for each available external access. The example in FIG. 5 shows two tunnels from the PAN to the home agent.

The main advantages achieved by having support for simultaneous multi-access for PANs are:

Being able to move traffic between accesses (and MRs) when links go up and down when for instance the user moves out of coverage for WLAN. This case can also occur if one of the MRs 'disappears' from the PAN, e.g. moves out of Bluetooth coverage or simply is switched off.

That a user of the PAN can select which access and MR to use and change the selection, e.g. if the user for some reason wishes to change access and move the traffic from one access to another (which may also mean moving the traffic from one MR to another). The reasons for the user to change MR may be, e.g., cost-reasons, corporate policy reasons etc.

That a greater accumulated bandwidth can be provided for external network access for the PAN, since traffic can use different accesses, i.e. some traffic can use for instance the cellular access and other traffic can use the WLAN traffic.

The solutions according to the invention would function in a similar way for this communication system comprising the PAN as for the communication system comprising a VAN shown in FIG. 3.

In the solutions according to the invention, an overall goal is to make the data packet routing work in a seamless manner across multiple MRs. As mentioned above, an important aspect for this to work is that at least some data is synchronized and coordinated between the MRs in a moving network. Such data may be information regarding the external accesses of all mobile routers in the moving network, such as types and properties of available accesses and states of the available accesses. Such data may also be access selection policies, i.e. policies how to route data packets and managing flows comprising data packets. It may also comprise which MR that is responsible for sending explicit instructions to a Home Agent regarding how the home agent should route packets in the opposite direction (from HA to MNN). Therefore, the solutions according to the invention provides a mechanism to ensure that a data packet belonging to a flow from an MNN is routed through the MR that is connected to the access selected for that particular flow.

The invention comprises solutions according to two different principles: a distributed solution and a centralized solution.

In the distributed solution all MRs have equal status and operate according to the same principles using the same mechanisms. All MRs have the same information used for access selection. Thereby, they will make the same decisions and select the same access for a specific packet.

In the centralized solution, one of the MRs takes on a superior role called super Mobile Router (super MR). The super MR is responsible for all flow management related decisions in the moving network, e.g., per flow access selections. In both solutions, the tunnel establishment mechanisms functions as mentioned above and as shown in co-pending application PCT/SE2004/001578. Also, the mechanisms to convey explicit flow management instructions to the HA, functions as shown in PCT/SE2004/001578.

Basic Principles of the Distributed Solution

Figure 6:
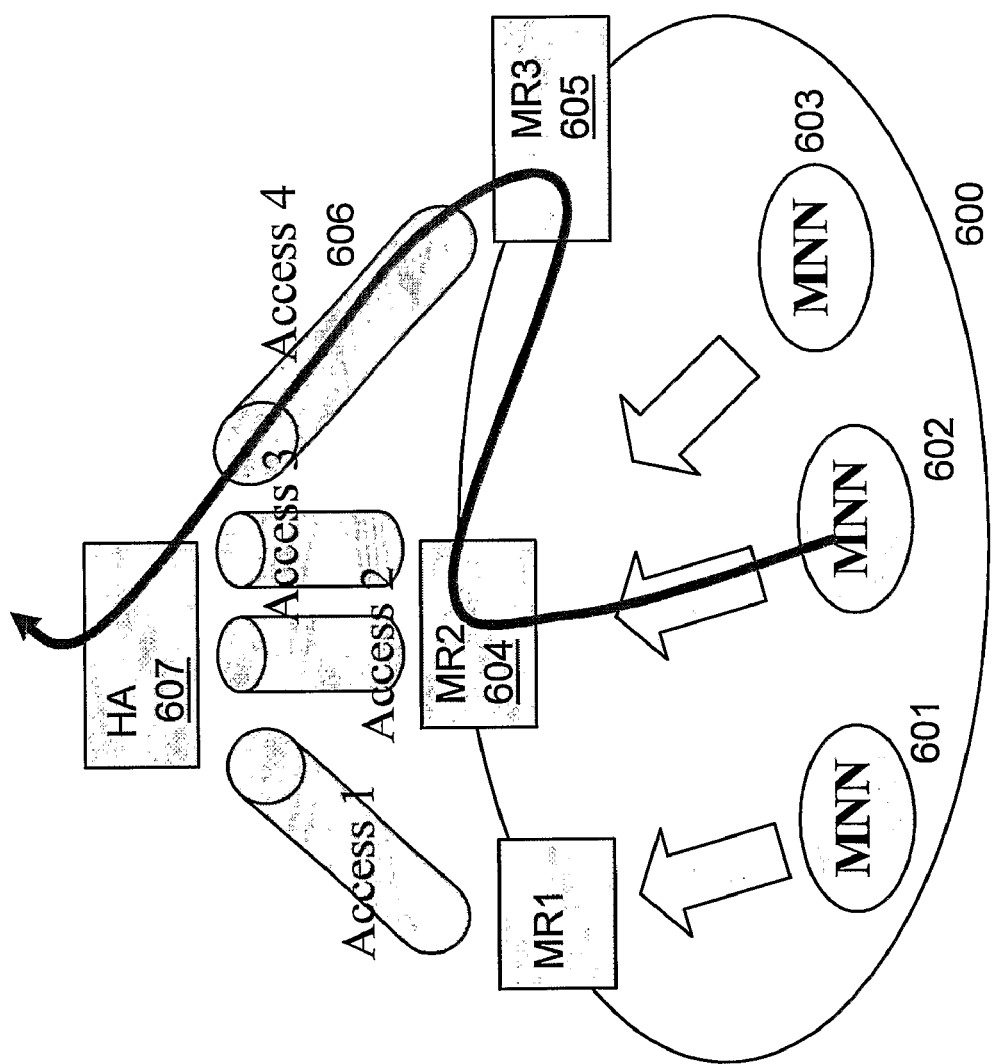
FIG. 6 is a schematic block diagram showing the routing of a packet according to an embodiment of the invention called a distributed solution.

In FIG. 6 it is shown how routing of a packet functions according to the embodiment of the invention called the distributed solution. In the distributed solution all MRs are "equal" and perform their own individual actions and decisions. For instance, all MRs may announce themselves as default gateways to the MNNs. As a consequence, MNNs may send packets belonging to data flows to any of the MRs. Therefore the MRs must be synchronized in terms of routing decisions and the data that the decisions are based on.

In FIG. 6, each MNN 601, 602, 603 selects a default router arbitrarily, (illustrated by the broad arrows from the MNNs to MR1 or MR2). For an uplink flow, the data packets are routed the following way (see the black narrow arrow in the figure): From an MNN 602 the packet is sent e.g. to MR2 604, since in this case the MNN has selected MR2 604 as its default router. The MR2 makes, according to this example, a routing decision that external Access 4 606 is the best access, and MR2 forwards the packet to MR3 605 that provides that access. The MR3 will, according to an embodiment of the invention, also make a routing decision, which is based on exactly the same input parameters, and will consequently also find that this packet should be sent over the Access 4 606 to a home agent 607 of the MR3 605. For a downlink flow, a packet will be sent over the Access 4 606 from the home agent 607 to the MR3 605. MR3 will deliver the packet directly to MNN 602.

Basic Principles of the Centralized Solution

Figure 7:
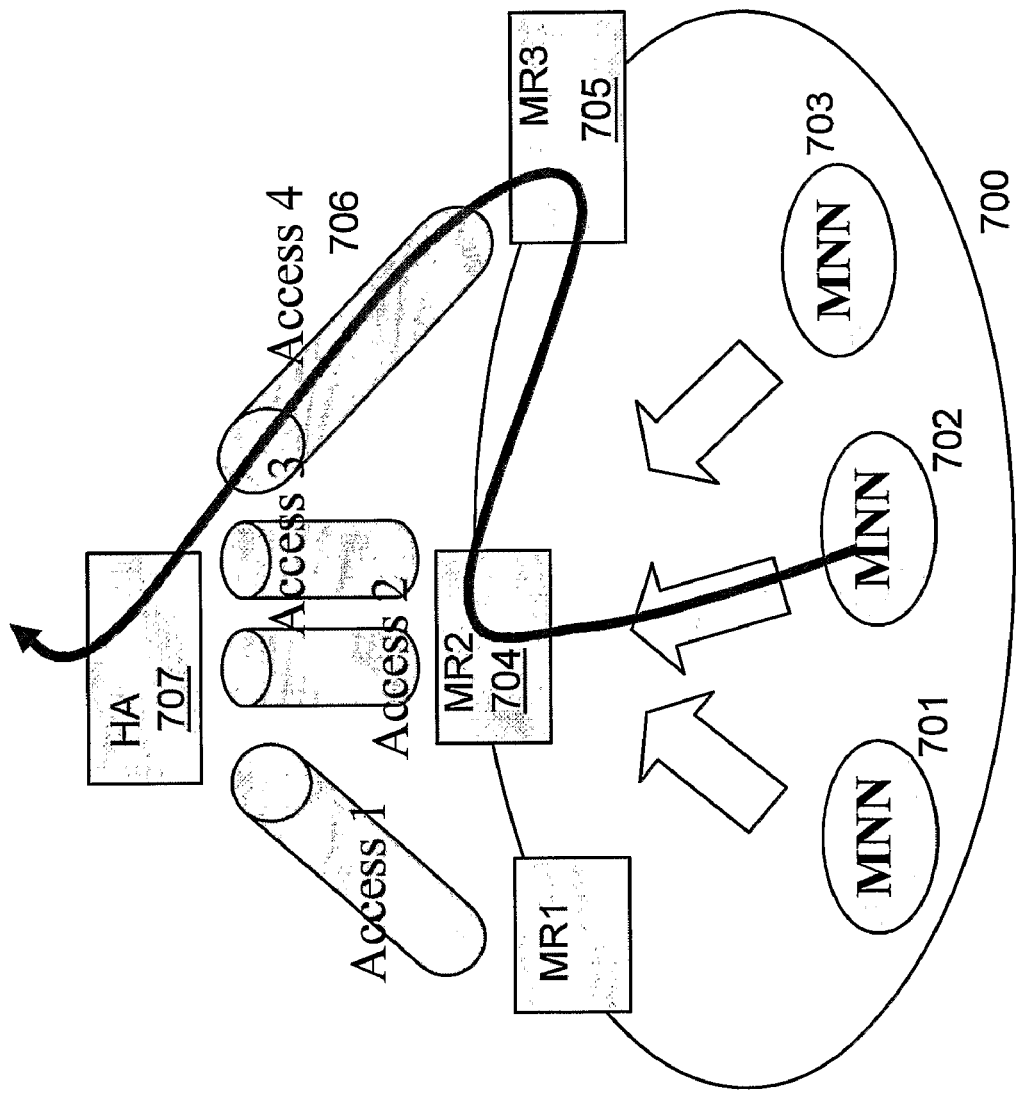
FIG. 7 is a schematic block diagram showing the routing of a packet according to an embodiment of the invention called a centralized solution.

In FIG. 7 it is shown how routing of a packet functions according to an embodiment of the invention called the centralized solution. In the centralized solution one of the MRs takes on a superior role called super MR. The super MR is selected (and re-selected when needed) among the available MRs using a distributed super MR selection mechanism, which will be described further down in the application. The super MR is the only MR that is visible to the MNNs, i.e. only the super MR advertises itself. Thus, all the MNNs set their default route towards the super MR and send their data flows to it. The super MR makes all the access selection decisions and forwards or redirects flows to the other MRs when needed. To enable the super MR to make appropriate per flow access selections all the other MRs must send all their MR specific input data to be used in the access selection process to the super MR.

In FIG. 7, all MNNs 701, 702, 703 have the selected super MR, which in this example is MR2 704 as their default router (illustrated by the broad arrows from the MNNs to the MR2). Thereby, all data originating from an MNN and destined to an external address ends up at MR2 704. From an MNN 702 a packet is sent to MR2 704. The MR2 makes, according to this example, a routing decision that external Access 4 706 is the best access, and MR2 forwards the packet to MR3 705 that provides that access. The MR3 will, according to an embodiment of the invention, also make a routing decision, which is based on exactly the same input parameters, even though it is not the super MR, and it will also find that this packet should go over the Access 4 706 to a home agent 707 of the MR3 705. For a downlink flow, a packet will be sent over the Access 4 706 from the home agent 707 to the MR3 705. MR3 will deliver the packet directly to MNN 702.

Synchronization of Input Data for Access Selection in the Distributed Solution

To ensure that multiple MRs in a moving network make consistent per flow routing decisions, the data that these decisions are based on should be synchronized between the MRs. The data that may be used as input data for routing decisions (in addition to the parameters characterizing the flow itself, such as addresses and ports), and which consequently have to be synchronized among the MRs, include access selection policies, the moving network nodes' end user/device profiles, types and properties of the available access links, the current load on the available links, load sharing algorithms and policies, etc.

Some of this data is highly dynamic, such as the current load on the available links, whereas other data changes less frequently, e.g. the types and properties of the available links.

Attributes describing this input data may be stored in Management Information Base (MIB) attributes and be transferred between the MRs using Simple Network Management Protocol (SNMP). Another way to distribute the data among MRs in a PAN would be to use the PAN Management Protocol (PMP) described in the pending patent application PCT/SE2004/001027. Yet a feasible way would be to use a protocol dedicated for this purpose. In the distributed solution, a dedicated protocol should preferably use a multicast address to distribute data among the MRs.

Synchronization of Input Data for Access Selection in the Centralized Solution

In the centralized solution the super MR will be first to make flow routing decisions, as all MNNs will send their packets to it. However, there is a need for all MRs in the moving network to receive some routing decision data, such as existing mobile routers and external accesses in the moving network, as:

1. The super MR role may change;
2. The super MR will forward flows to other MRs depending on the selected access and each of these MRs need to make the same decision;
3. The dynamic data (such as current load on the available links) must be distributed to at least the super MR, and
4. Any MR may need to send explicit routing instructions to the HA for the downlink part of a flow, i.e. the flow from a HA to an MNN via any of the MRs.

Therefore, according to one embodiment of invention, the solution for synchronizing input data for access selection in the centralised solution is mainly the same as in the distributed solution described above, i.e. that substantially all data that routing decisions are based upon are synchronized between the mobile routers in the moving network.

Although, according to another embodiment of the centralized solution, routing decision data is not synchronized at the mobile routers that are not selected as the Super Mobile router. In this case, in the scenario described in FIG. 7, the MR3 705 would not take any routing decision and select external access. Instead, the super MR, MR2 704 in FIG. 7, would inform about the access that it has selected, for example by marking the packet to be routed in a special manner indicating the routing decision, by tunneling the packet in a certain manner or by sending an explicit instruction comprising the routing decision, for example by sending a flow state, when such a state has been recorded.

According to yet another embodiment of the centralized solution, only some routing decision data regarding access status and policies is synchronized at the mobile routers that are not selected as the super MR, e.g. MR3 in FIG. 7. The routing decision data that is synchronized would be enough data to be able to make a correct routing decision when the MR, e.g. the MR3 in FIG. 7, receives a packet from a super MR. This would be possible in the centralised solution because this MR, e.g. MR3 in FIG. 7, would know that it will only make a routing decision between its own external accesses, and that it shall never send the packet to another mobile router.

If data used for access selection is sent only to the super MR, then no multicast group is needed for this data distribution, unicast delivery to the super MR suffices.

Routing a Flow Through the Mobile Router of a Selected Access

The procedure described in the co-pending patent application PCT/SE2004/001578 is defined for a moving network with a single MR, but the routing decisions are basically made in the same way for multiple MRs. In addition, each MR will have some additional input data, such as external accesses available behind other MRs, to base its decisions on. The routing action is extended, as not all outgoing accesses are local to the MR, but are reachable through another MR. Finally, further down in the application, ways are defined to ensure that no routing loops or redirection loops are formed between the MRs.

For a particular flow, the MR that receives a packet may or may not be the correct outgoing MR, depending on the routing decision. For outgoing packets, i.e. in the direction from an MNN to the HA, if another MR is the outgoing MR, i.e. has the correct external access for this flow, the MR that received the packet will forward the packet towards the outgoing MR. Tunneling from the MR that received the packet to the outgoing MR is an alternative to forwarding, but the effect is exactly the same. For an incoming packet from the HA, the MR simply delivers it to the destination MNN.

Any MR that receives a packet classifies what flow it belongs to and follows earlier routing decisions, if there are any, such that the same access is selected as for previous packets of the flow. If the packet belongs to a previously (by this MR) unidentified flow, the MR will make a routing decision, select what access or accesses to use, both for the uplink and downlink parts of the flow. In the case when the downlink and uplink parts of the flow are asymmetrical, the uplink and downlink parts of the flow may use different accesses, which accesses may even belong to different MRs. This routing decision will be stored such that it can be used for subsequent packets of the same flow. The access/accesses selected indirectly points out what outgoing MR should be used for uplink packets and what care-of address should be used for downlink packets.

If the access selected for the downlink part of a flow is different from access selected for the uplink part of the same flow, one of the MRs should send explicit instructions to the HA, in substantially the same manner as explained in PCT/SE2004/001578. Unless the downlink tunnel selection for a particular newly identified (asymmetric) flow is already covered by previously sent instructions to the HA, it is preferred that the outgoing MR sends this instruction to the HA. This means that only one MR will send the instruction, which is important not to confuse the HA. The MR that sends the instruction has to be one involved in the current routing path of the flow. The MR that has the desired downlink access may not be in the routing path until the HA has been instructed, which means that this MR will not see any packets and will not perform any routing decisions. The MRs that are in the current routing path are:
1. the MR that MNN uses as default router;
2. the outgoing MR, and
3. the receiving MR for the downlink part of the flow, which may be the default MR for unidentified flows from the home agent's point of view.

Sending Explicit Instructions to the HA

As described in above, an MR may send explicit tunnel selection instructions to the HA triggered by a new flow. In that case the explicit tunnel selection instructions would pertain only to that particular flow. In this case the MR that identifies the outgoing flow and that is the outgoing MR should be the one sending the explicit instructions to the HA.

However, MRs may also send more generic explicit tunnel selection instructions, covering e.g. types of flows, which the HA will use for flows to come. The mechanisms for this are described in PCT/SE2004/001578 for the single MR solution. In this multiple MR case, any MR could potentially send the instructions. One possible approach for this case would be to let each MR be responsible for sending the instructions that point towards a tunnel that leads to the MR itself. Another approach, useful particularly for the centralized solution, would be to let an MR send instructions related to all tunnels. For instance, in the centralized solution the super MR could be responsible for sending all explicit instructions to the HA. The super MR could do this even for the instructions that pertain only to a single flow and that are triggered by a new outgoing flow, since all outgoing flows are tunneled through the super MR.

When MRs are allowed to send explicit tunnel selection instructions pointing towards tunnels that do not lead to the MR itself, a consequence is that the care-of addresses of the MRs have to be included in the information that is distributed among the MRs. The reason is that in the explicit instructions sent to the HA, the tunnel to be selected is indicated by the address of a tunnel endpoint at the MR and this tunnel endpoint address is the care-of address of the MR.

Super MR Selection

In the embodiments of the invention where the centralized solution is used, the MRs in the moving network have to agree on which of the MRs that should act as the super MR. This super MR selection process should be seen as a dynamic, continuously ongoing process, since new MRs may appear, as new accesses become available, and old MRs may cease to be MRs, if their accesses become unavailable, or even disappear, when they are disconnected from or moved out of radio range of the moving network.

The proposed super MR selection process is based on the MRs exchanging their respective so-called Super MR Selection Number (SMSN), which is a number in the range [SMSNmin ... SMSNmax], along with the IP address. The MR that has the greatest SMSN is selected as the super MR. If more than one MR has the same greatest SMSN, then the one of those MRs that has the greatest IP address is selected as the super MR. As soon as a node turns into an MR, i.e. when a node in a moving network offers other nodes in the moving network access to an external network via itself, e.g. through a newly appearing access link, it should generate an SMSN and join the super MR selection process by starting to exchange SMSN and IP address with the other MRs, if any, in the moving network. The MR should not advertise itself as a router to the moving network nodes, i.e. send Router Advertisement messages, in the moving network, unless it has determined, through the super MR selection process, that it is the super MR of the moving network.

Figure 8:
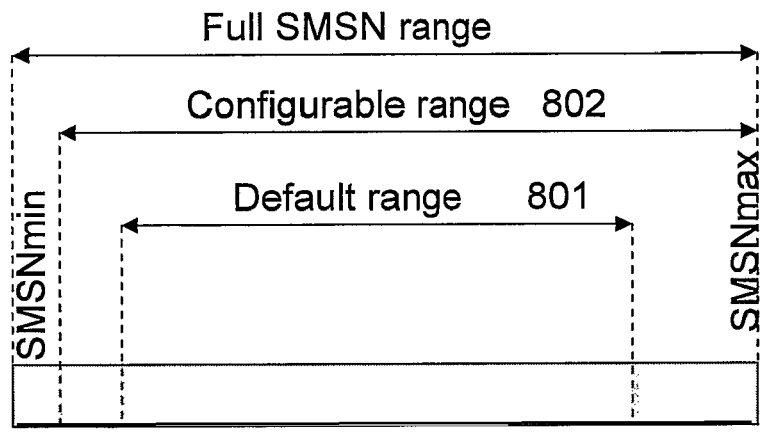
FIG. 8 shows a diagram of the range of possible values used for selecting super mobile router in the centralized solution.

An MR can generate its SMSN values in three different ways, as illustrated in FIG. 8:
1. Randomly generate the SMSN in the default range 801 [SMSNdefault_range_min ... SMSNdefault_range_max], where SMSNdefault_range_min>SMSNmin and SMSNdefault_range_min<SMSNdefault_range_max<SMSNmax.
2. Randomly generate the SMSN in a configured range 802 [SMSNconfigured_range_min . . . SMSNconfigured_range_max], where SMSNconfigured_range_min>SMSNmin and SMSNconfigured_range_min≦SMSNconfigured_range_max≦SMSNmax. SMSNconfigured_range_min=SMSNconfigured_range_max indicates that the MR is configured to set its SMSN=SMSNconfigured_range_min=SMSNconfigured_range_max.
3. Set the SMSN=SMSNmin. This SMSN value is used only by a node that ceases to be a MR, e.g. because its external access becomes unavailable.

An administrator of the MRs may utilize the SMSN configuration possibilities to control or bias the super MR selection process in a moving network. For example, the administrator could configure the MRs to randomly generate the SMSN in different sub-ranges, or even configure the MRs to set the SMSN to different specific values, depending on the type or properties of their available access(es). Typically, a high capacity access would result in a higher SMSN sub-range or value being used than a low capacity access. In general, a beneficial way of using the SMSN configuration possibilities would be to match the SMSN configurations with the routing policies/flow management policies, such that the MR that, under the current circumstances, is expected to route the most traffic through its access(es), is also selected as the super MR.

A list of events that may trigger generation of a new SMSN in a node comprises:
  The node becomes an MR;
  The node ceases to be an MR, in which case the node sets its SMSN=SMSNmin;
  The properties of the MR and/or its accesses, change in a way that affects the range within which the mobile router's SMSN should be generated, e.g. switching from the default range to a configured range or vice versa, or switching from one configured range to another. An example of such a property change may be that a new access type becomes available or unavailable. Another example may be that the node becomes the super MR;

The mobile router's SMSN configuration is changed in a way that affects the range within which the mobile router's SMSN should be generated, e.g. switching from the default range to a configured range or vice versa, or switching from one configured range to another.

For the super MR selection process, a novel specific Super MR Selection Protocol (SMSP) may be defined including a single message type, e.g. denoted "SMSN Announcement". An SMSN Announcement includes at least the SMSN of the sending node. The receiver of an SMSN Announcement also needs the IP address of the sending node to associate with the received SMSN. This IP address can be included in the SMSN Announcement or the receiver may extract it from the IP header. If the moving network e.g. is a PAN, the PAN Management Protocol defined in PCT/SE2004/001027 may be used in the Super MR Selection process.

SMSP is preferably an application level protocol running on top of UDP. The SMSN Announcements are preferably multicast to a multicast address dedicated for MRs, but broadcasting the messages would also work.

Each MR should periodically send SMSN Announcements. The time interval between two SMSN announcements should be SMSNbase_period+Drand, where SMSNbase_period is a fixed value and Drand is a random delay value that is randomly generated for each SMSN Announcement period. Drand is generated within the interval [Drand_min . . . Drand_max]. Thus the maximum time between two SMSN Announcements transmitted from the same MR is ideally SMSNideal_max_period=SMSNbase_period+Drand_max. However, in a shared medium network the actual transmission of a SMSN Announcement may be further delayed due to contention for the shared medium (e.g. collisions).

When joining the super MR selection process a node should wait for at least N SMSNideal_max_periods before selecting a super MR, i.e. before determining which MR it should consider to be the super MR. An appropriate value of N could be e.g. N=2.5. Likewise, a node participating in the super MR selection process should not consider the super MR, or any other MR, as unavailable until at least N SMSNideal_max_periods have passed without receiving an SMSN Announcement from the super MR or other MR. When the node determines that the super MR is unavailable, it selects the one of the remaining MRs that has announced the greatest SMSN, or, if several MRs has announced the same greatest SMSN, the one of these that has the greatest IP address.

However, when a node participating in the super MR selection process receives an SMSN Announcement from another MR than the current super MR, including an SMSN that is greater than that of the current super MR, or if the node itself sends such a SMSN Announcement, then the node should immediately determine that the MR sending the concerned SMSN Announcement is the new super MR. Likewise, if a node participating in the super MR selection process receives an SMSN Announcement from the current super MR containing a new SMSN value that is no longer great enough to motivate the sending node's status as the super MR, i.e. if the announced new SMSN is smaller than that of another MR or equal to the SMSN of another MR that has a greater IP address, then the node should immediately select a new super MR based on SMSN Announcements received from the other MRs.

When an MR (the super MR or another MR) ceases to be an MR, it should set its SMSN=SMSNmin and keep sending at least M more SMSN Announcements with the SMSN=SMSNmin, in order to clearly notify the other MRs that it is no longer a MR, before leaving the super MR selection process. An appropriate value of M could be, e.g., M=2.

Due to long timeouts of the default router configuration in the nodes in the moving network, it may take a significant time before a super MR change is reflected in the way the nodes of the moving network direct their outgoing external traffic, i.e. to which router they send packets bound for destinations outside the moving network. Therefore, a method enforcing conservative super MR changes may be useful. For instance, if a certain external access frequently comes and goes, i.e. switches between being and not being available, it may be beneficial that the super MR does not change every time the access comes or goes, even if the SMSN configuration of the affected MR, and the SMSN situation in the moving network as a whole, is such that a change in the availability of the external access would imply a super MR change.

There are different possible approaches for a method to enforce conservative MR changes:

Time based approach: An MR whose SMSN is to be changed due to a changed property, e.g. that one of its accesses became available or unavailable, delays the execution of this SMSN change. This gives the changed property some time to change back again, in which case the SMSN change is cancelled. This way SMSN fluctuations, and consequently the frequency of super MR switches, can be reduced. It should be configurable which type of SMSN changes that should be delayed and which that should not be delayed, e.g. that increases are delayed but not decreases, or that the delay is triggered by certain property changes but not by others.

Based on SMSN manipulations. When an MR becomes the super MR it increases its SMSN to a higher value in order to reduce the risk that it is quickly deposed from the super MR throne by another MR that whose SMSN is increased. The super MR would keep the high SMSN value until an SMSN change is triggered by any of the usual triggering events, e.g. property changes, or until another MR takes over the super MR role. The following are two concrete proposals for how to implement this method:

When an MR that has generated its SMSN in the default range becomes the super MR, i.e. when it determines itself to be the super MR, it sets its SMSN=SMSNdefault_range_max+1 and can thus only be replaced by an MR that has been configured to generate a SMSN value greater than SMSNdefault_range_max.

When an MR becomes the super MR, i.e. when it determines itself to be the super MR, it sets its SMSN=SMSNmax. Then, unless another MR with a greater IP address sets its SMSN=SMSNmax, which can only happen if the MR is configured to be able to do so, the selected super MR will continue to be the super MR until it ceases to be an MR or until its properties, or the properties of its access/accesses, change in a way that according to its SMSN configuration indicates that a new SMSN should be generated in the node despite its status as the super MR.

A combination of time based methods and methods based on SMSN manipulations.

A possible variation of the super MR selection scheme, is to let a node include in its SMSN Announcements, in a field denoted "super MR address field", the IP address of the MR that it currently considers to be the super MR. When this variation/option is used, an MR would not forward traffic to a selected super MR, until the selected super MR announces that it considers itself to be the super MR, by including its own IP address in the super MR address field of its SMSN Announcement. This feature could be used to avoid loops, if inconsistencies occur. An MR that currently does not know which MR it considers to be the super MR indicates this by including an all-zero address in the super MR address field of its SMSN Announcements or by omitting the super MR address field.

Redirection Mechanism

If the MR that receives an outgoing packet from an MNN, e.g. the first MR, makes a routing decision and finds that another MR will be the outgoing MR, it may send a redirect message back to the MNN to instruct the MNN that for subsequent transmission of packets to the particular destination, the MNN should use a different next hop towards the other MR. The next hop is the link-local IPv6 address of the outgoing MR. This will reduce the number of hops by one as subsequent packets will be sent directly to the outgoing MR and not via the first MR. The redirect message may be an Internet Control Message Protocol (ICMPv6) for the Internet Protocol Version 6 (IPv6) Redirect message, which is described in "Internet Control Message Protocol (ICMPv6) for the Internet Protocol Version 6 (IPv6)", by A. Conta et al., published on the Internet as RFC 2463 in December 1998.

Conceptually, the redirection is stored (with a limited lifetime) in a destination cache of the MNN.

If the ICMPv6 Redirect message is used, this redirect is valid for the particular destination IPv6 address. This does not exactly match the granularity of flow differentiation that this invention aims at, since an MNN may very well have multiple flows towards a single destination. In this case the MRs must be able to route these flows independently over different accesses. The solution to this is to extend the standard for the redirect message to optionally also include source port number, destination port number, protocol, flow label or Security Parameter Index (SPI). Although, this would require changes to the MNNs.

Routing and Redirection Loop Avoidance

If the different mobile routers make inconsistent routing decisions, i.e. if they, for some reason would select different external accesses even though they should base their selection on the same information, there is a risk that routing loops are formed within the moving network such that MRs forward a certain outgoing packet back and forth between each other without the packet exiting through en external access. One way to cope with routing loops is for an MR to detect when an outgoing packet that, according to the routing decision of the MR, should be sent through an access of another MR is received from an MR (instead of from an MNN). When such a packet is detected the MR overrides its regular routing decision and sends the packet through one of its own accesses instead of forwarding it to another MR. This behavior avoids that a routing loop is caused by inconsistent routing decisions. The MR could do so with the underlying assumption that the regular distribution and synchronization of access selection related information will eventually resolve the inconsistency.

When an MR sends a redirect message to an MNN, as described above, the MR records, and maintains for a short while, maybe one or a couple of seconds, the flow state for the redirected packet. If, for some reason, the MR receives from the MNN, a subsequent packet belonging to the redirected flow, the MR concludes that a redirection loop has been formed. In that case, the MR does not send another redirect message to the MNN, but overrides its regular routing decision and sends the packet through one of its own external accesses. Thereby, a redirection loop is avoided. The MR could do so with the underlying assumption that the regular distribution and synchronization of access selection related information will eventually resolve the inconsistency.

For both routing loops and redirection loops, the MR may also use a more proactive approach. Instead of waiting for the regular distribution of access selection related information to resolve the inconsistency, the MR may, immediately after detecting a routing or redirection loop, distribute its own relevant data and indicate in a message comprising the access selection related information that inconsistencies are present. This indication will trigger immediate sharing of all relevant information among the MRs.

Figure 9:
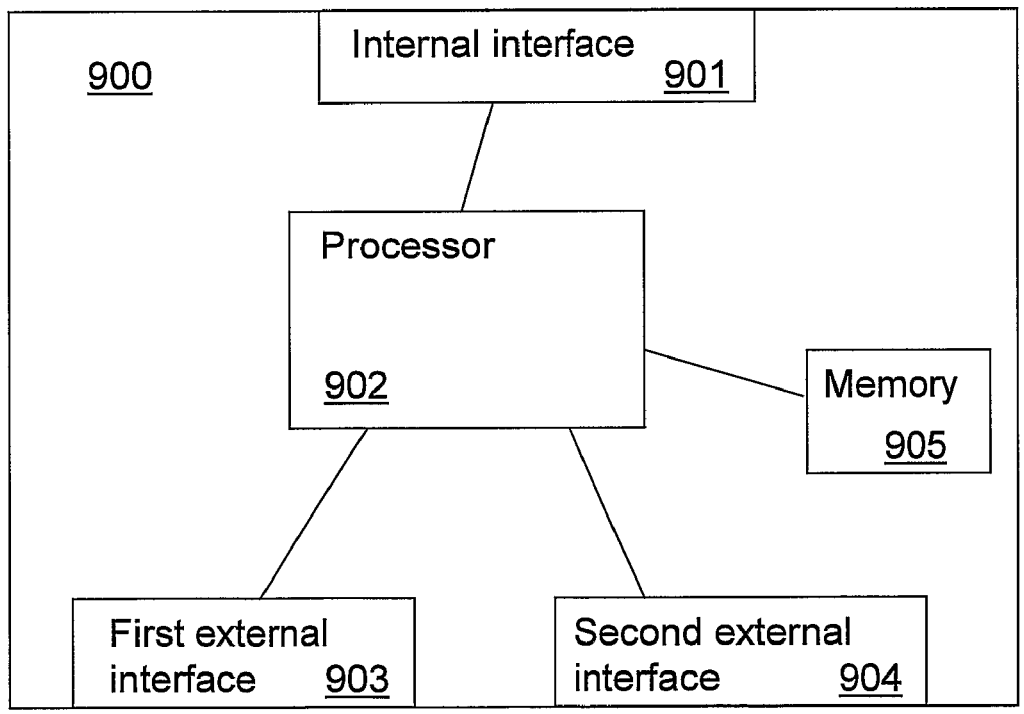
FIG. 9 shows a schematic block diagram of a mobile router according to an embodiment of the invention.

FIG. 9 shows a mobile router 900 according to an embodiment of the present invention, for example the mobile router MR1 in FIG. 3. The mobile router 900 comprises:

An internal interface 901, for receiving data packets and information from MNNs and other MRs in the moving network and for sending packets and information to MNNs and other MRs in the network;
  A processor 902 for selecting external access for routing data packets based on information in the data packets and other information relevant for external access selection, such as information about the external accesses in the network and access selection policies, wherein the processor is arranged to analyse the information in the data packets and other relevant information and to make a routing decision based on the analyses such that external access is selected;
  A memory 905 for storing information about external accesses in the network, access selection policies and flow states regarding routing decisions for previously routed packets, and,
  At least one external interface, in this example a first external interface 903 and a second external interface 904, for getting access to at least one external access such that data can be routed via a tunnel set up through the at least one external access to the home agent.

Corresponding means for performing the steps according to claims 1-16 may be implemented with computer program software in a mobile router.

Compared to conventional moving network procedures, the procedures described in previous co-pending patent application PCT/SE2004/001578 allowed a single MR to have multiple active tunnels to increase throughput, provide better redundancy and to be able to load-balance/share the traffic, without downgrading e.g. transport layer characteristics such as TCP measurements by making arbitrary forwarding decisions over different paths per flow. The procedures described in PCT/SE2004/001578 also allowed the moving network to differentiate traffic to and from different MNNs over different accesses. It also allowed the moving network to differentiate flows over different accesses, such that flows of a particular type may be forwarded over a particular access, for instance. Further, the procedures described in PCT/SE2004/001578 allowed a single MR to make all decisions on over what access each particular flow is routed. The HA will follow the mobile router's decisions. The mobile router's decisions will be transparent to the MNNs and they will not have to worry about multiple accesses that are available to the moving network, while still being able to use them.

The present invention as described above has all the advantages of the procedures described in the previous patent application. In addition, this invention further enhances the procedures described in the previous patent application by the possibility to use multiple MRs in a moving network while still honoring the requirements and advantages of the procedures described in the previous patent application. Each MR may provide one or multiple external accesses and the union of all accesses on all MRs are made available for use by the MNNs in the moving network. The result towards the MNNs is the same as in the single-MR case. This means that the MRs all behave consistently and according to the same policy. The result, i.e. the access selection, is the same independently of the default router selected by an MNN.

In both the distributed solution embodiment and the centralized solution embodiment of the present invention, the MRs can back up for each other. The failure of an MR only means that the moving network loses the accesses provided by that MR; it does not mean that the moving network loses all connectivity to the infrastructure. This invention does not place any additional requirements on the MNNs, except if the optional enhanced redirection mechanism is to be used. This invention does not place any additional requirements on the Home Agent other than those required by the previous procedures.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method in a communication system for routing a data packet originating from a moving network node in a moving network via a first mobile router of the moving network to a home agent in a home network of the moving network, wherein the first mobile router has the ability to access at least one first external access through which at least one first external access one tunnel each is set up to a first home agent of the first mobile router and wherein the moving network has at least one second mobile router, and wherein the at least one second mobile router has ability to access at least one second external access, through which at least one second external access one tunnel each is set up to a second home agent of the at least one second mobile router, and wherein each mobile router in the moving network has information regarding the at least one first and the at least one second external accesses in the moving network, the method comprising the steps of:
    receiving, at the first mobile router, a data packet from a moving network node;
    selecting, in the first mobile router, one of the at least one first or second external accesses for routing the data packet to the first or second home agent based on information in the data packet and on the information regarding the at least one first and the at least one second external accesses; and
    routing the data packet from the first mobile router to the first or second home agent via the tunnel set up through the selected external access.

2. The method according to claim 1 wherein the step of selecting is also based on access selection policies stored in the first mobile router.

3. The method according to claim 1, wherein the method further comprises the step of, when required, exchanging the information regarding the at least one first and the at least one second external accesses in the moving network, between the first and the at least one second mobile router in the moving network such that the information regarding the at least one first and the at least one second external accesses is synchronized among the first and the at least one second mobile router.

4. The method according to claim 2, wherein the method further comprises, when required, synchronizing the access selection policies between the first and the at least one second mobile router in the moving network.

5. The method according to claim 1, wherein the step of routing the data packet from the first mobile router further comprises:
    routing the data packet from the first mobile router to one of the at least one second mobile router, if the selected external access is one of the at least one second external access; and
    routing the data packet from the one of the at least one second mobile router to the second home agent via the selected external access.

6. The method according to claim 5, further comprising, in the one of the at least one second mobile router after the data packet has been routed from the first mobile router to the one of the at least one second mobile router, the steps of:
    selecting one of the at least one second external access for routing the data packet to the second home agent based on information in the data packet and on the information about the external accesses in such a way that the same external access is selected as was selected by the first mobile router; and
    routing the data packet from the one of the at least one second mobile router to the second home agent via the selected external access.

7. The method according to claim 1, wherein the step of selecting further comprises:
    reading the information in the data packet to detect whether the data packet belongs to an already recorded data flow; and,
    if the data packet belongs to an already recorded data flow,
        making a routing decision for the data packet according to a routing decision stored in a flow state for the already recorded data flow and according to the information regarding the at least one first and the at least one second external accesses in the moving network, and,
    if the data packet belongs to a flow that has not been recorded:
        making a routing decision for the data packet according to access selection policies and according to the information regarding the at least one first and the at least one second external accesses in the moving network;
        recording a flow state for the flow that the data packet belongs to, which flow state comprises the routing decision and a flow identification.

8. The method according to claim 1, wherein the first mobile router is a super mobile router, and wherein the super mobile router instructs the moving network nodes to send data packets that are directed to a node external of the moving network via the super mobile router.

9. The method according to claim 8, wherein the first mobile router is selected to be the super mobile router based on a super mobile router selection number (SMSN) for each of the first and the at least one second mobile router, which SMSN is determined by each of the first mobile router and the at least one second mobile router and exchanged between the first mobile router and the at least one second mobile router such that each mobile router is aware of each mobile router's SMSN.

10. The method according to claim 9, wherein the SMSN is dynamically determined and wherein the role of being the super mobile router may change dynamically between the first mobile router and the at least one second mobile router based on the SMSN and wherein a mobile router generates an SMSN if any of the following events occur:
- the mobile router is a new mobile router appearing in the moving network;
- the mobile router ceases to be a mobile router in the moving network;
- a property of the mobile router and/or its external accesses changes; or
- an SMSN configuration of the mobile router changes.

11. The method according to claim 10, wherein each of the first and the at least one second mobile router selects the first mobile router as the super mobile router if the first mobile router has the highest SMSN, and wherein the role of the super mobile router is changed from the first to one of the at least one second mobile router if any of the following occurs:
- the SMSN of the first mobile router has been lower than the SMSN of one of the at least one second mobile router for at least a certain time; or
- the SMSN of the first mobile router added with a certain value is lower than the SMSN of one of the at least one second mobile router.

12. The method according to claim 1, wherein the first mobile router is any mobile router in the moving network.

13. The method according to claim 1 wherein a routing loop, being a packet is sent back and forth between two mobile routers due to inconsistent access selection, is avoided by the first mobile router:
- detecting whether the packet is received from one of the at least one second mobile router or from a moving network node, and, if the packet is received from one of the at least one second mobile router; and
- sending the packet through one of the at least one first external access.

14. The method according to claim 1, wherein, if the selected external access is accessible from one of the at least one second mobile router, the first mobile router sends a redirect message to the moving network node instructing the moving network node to send the next data packet of the same flow directly to the one of the at least one second mobile router.

15. The method according to claim 14, wherein, if the first mobile router receives a subsequent data packet belonging to the same flow as the data packet for which the first mobile router sent the redirect message, the first mobile router sends the subsequent data packet through one of its at least one first external access.

16. The method according to claim 1, wherein the first home agent is the same home agent in the same home network as the second home agent.

17. A mobile router of a moving network in a communication system arranged for routing a data packet originating from a moving network node in the moving network to a home agent in a home network of the moving network, wherein the mobile router has ability to access at least one first external access, through which at least one first external access one tunnel each is set up to a first home agent of the mobile router, the mobile router comprising:
- means for storing information regarding the at least one first external access and regarding at least one second external access, which at least one second mobile router has the ability to access, and through which at least one second external access one tunnel each is set up to a second home agent of the at least one second mobile router;
- means for receiving a data packet from a moving network node;
- means for selecting one of the at least one first or second external accesses for routing the data packet to the first or second home agent, wherein the selection that the means for selecting is arranged to accomplish is based on information in the data packet and on the information regarding the at least one first external access and the at least one second external access; and
- means for routing the data packet to the first or second home agent via the tunnel set up through the selected external access.

18. The mobile router according to claim 17, wherein the selection that the means for selecting is arranged to accomplish is also based on access selection policies stored in the means for storing information in the mobile router.

19. The mobile router according to claim 17, wherein the mobile router has means for sending and receiving the information regarding the at least one first and the at least one second external accesses, to and from the at least one second mobile router such that the information regarding the at least one first and the at least one second external accesses is exchanged and synchronized at the mobile router.

20. The mobile router according to claim 18, wherein the mobile router further has means for synchronizing the access selection policies with the at least one second mobile router in the moving network.

21. The mobile router according to claim 17, wherein the means for routing the data packet is arranged for routing the data packet to one of the at least one second mobile router, if the selected external access is one of the at least one second external access.

22. The mobile router according to claim 17, wherein the means for routing the data packet is arranged for routing the data packet to the first home agent via the tunnel set up through one of the at least one first external access, if the selected external access is one of the at least one first external access.

23. The mobile router according to claim 17, wherein the means for selecting is further arranged for reading the information in the data packet to detect whether the data packet belongs to an already recorded data flow; and,
- if the data packet belongs to an already recorded data flow, making a routing decision for the data packet according to a routing decision stored in a flow state for the already recorded data flow and according to the information regarding the at least one first and the at least one second external accesses in the moving network, and,
- if the data packet belongs to a flow that has not been recorded:
  - making a routing decision for the data packet according to access selection policies and according to the information regarding the at least one first and the at least one second external accesses in the moving network; and
  - recording a flow state for the flow that the data packet belongs to, which flow state comprises the routing decision and a flow identification.

24. The mobile router according to claim 17, wherein the mobile router is a super mobile router, and wherein the super mobile router is arranged to instruct the moving network nodes to send data packets that are directed to a node external of the moving network via the super mobile router.

25. The mobile router according to claim 24, wherein the mobile router was selected to be the super mobile router based on a super mobile router selection number (SMSN), determined for each of the mobile router and the at least one second mobile router and exchanged between the mobile router and the at least one second mobile router.

26. The mobile router according to claim 25, wherein the SMSN is dynamically determined and wherein the mobile router is arranged to determine a new SMSN if any of the following events occur:
- the mobile router is a new mobile router appearing in the moving network;
- the mobile router ceases to be a mobile router in the moving network;
- a property of the mobile router and/or its external accesses changes; or
- an SMSN configuration of the mobile router changes.

27. The mobile router according to claim 17, wherein the mobile router is any mobile router in the moving network.

28. The mobile router according to claim 17, wherein a routing loop, being a packet is sent back and forth between two mobile routers due to inconsistent access selection, is avoided by the mobile router being arranged for detecting whether the packet is received from one of the at least one second mobile router or from a moving network node, and, if the packet is received from one of the at least one second mobile router, sending the packet through one of the at least one first external access.

29. The mobile router according to claim 17, wherein, if the selected external access is accessible from one of the at least one second mobile router, the mobile router is arranged for sending a redirect message to the moving network node instructing the moving network node to send the next data packet of the same flow directly to the one of the at least one second mobile router.

30. The mobile router according to claim 29, wherein, if the mobile router receives a subsequent data packet belonging to the same flow as the data packet for which the mobile router sent the redirect message, the mobile router is arranged to send the subsequent data packet through one of its at least one first external access.

31. The mobile router according to claim 17, wherein the first home agent is the same home agent in the same home network as the second home agent.

32. A computer program product loaded into a memory of a digital computer device residing in the mobile router, wherein the computer program product comprises software code portions for performing the method of claim 1 when the computer program product is run on a computer device.

* * * * *